(12) United States Patent
Johansson et al.

(10) Patent No.: US 9,321,449 B2
(45) Date of Patent: Apr. 26, 2016

(54) TRANSMISSION CONTROL SYSTEM

(71) Applicant: SCANIA CV AB, Södertälje (SE)

(72) Inventors: Oskar Johansson, Stockholm (SE); Mikael Ögren, Södertälje (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/410,238

(22) PCT Filed: Jun. 26, 2013

(86) PCT No.: PCT/SE2013/050771
§ 371 (c)(1),
(2) Date: Dec. 22, 2014

(87) PCT Pub. No.: WO2014/003655
PCT Pub. Date: Jan. 3, 2014

(65) Prior Publication Data
US 2015/0330502 A1    Nov. 19, 2015

(30) Foreign Application Priority Data

Jun. 27, 2012 (SE) .................................. 1200393

(51) Int. Cl.
*B60W 40/076* (2012.01)
*B60W 10/11* (2012.01)
(Continued)

(52) U.S. Cl.
CPC ......... *B60W 10/11* (2013.01); *B60W 30/18072* (2013.01); *B60W 40/076* (2013.01);
(Continued)

(58) Field of Classification Search
None
See application file for complete search history.

(56) References Cited

U.S. PATENT DOCUMENTS 6,182,000 B1 * 1/2001 Ohta .................. B60K 31/0058
180/170
6,188,950 B1 * 2/2001 Tsutsumi ........... B60K 31/0008
180/170

(Continued)

FOREIGN PATENT DOCUMENTS

DE   10 2008 023 135 A1   11/2009
DE   10 2010 030 346 A1   12/2011
WO   WO 2011/075065 A1   6/2011

OTHER PUBLICATIONS

International Search Report dated Oct. 31, 2013 issued in corresponding International patent application No. PCT/SE2013/050771.

(Continued)

*Primary Examiner* — Justin Holmes
(74) *Attorney, Agent, or Firm* — Ostrolenk Faber LLP

(57) ABSTRACT

A method and a system for choosing a transmission mode in a vehicle over the course of a road section, in which a simulation of at least one future speed profile $v_{sim}$ for the road section ahead of the vehicle is conducted on the basis of a road slope for the road section. A time period $T_{appl}$ is determined on the basis of the at least one simulated future speed profile $v_{sim}$, which ensures that a lower transmission mode is chosen before a lowest permitted speed $v_{min}$ defined for the road section and/or a set speed $v_{set}$ for a speed control is reached. During the determined time period $T_{appl}$, the transmission mode which is utilized when the simulation is made is applicable for the vehicle. After this, it is evaluated whether a lower transmission mode than the currently used transmission mode shall be chosen. A lower transmission mode shall be chosen if the time period $T_{appl}$ for which the current transmission mode is applicable is shorter than a first threshold period $T_{lim}$.

20 Claims, 5 Drawing Sheets

(51) Int. Cl.
*F16H 59/44* (2006.01)
*B60W 30/18* (2012.01)
*F16H 61/02* (2006.01)
*F16H 59/66* (2006.01)

(52) U.S. Cl.
CPC ............... *F16H 59/44* (2013.01); *F16H 59/66* (2013.01); *F16H 61/0213* (2013.01); *B60W 2030/1809* (2013.01); *B60W 2030/18081* (2013.01); *B60W 2550/142* (2013.01); *B60W 2550/143* (2013.01); *B60W 2550/402* (2013.01); *F16H 2059/663* (2013.01); *F16H 2061/0232* (2013.01)

(56) References Cited

U.S. PATENT DOCUMENTS 6,434,472 B1 * 8/2002 Minowa ............. B60K 31/0008
 477/115
6,597,981 B2 * 7/2003 Nishira ............. B60K 31/0008
 180/170

OTHER PUBLICATIONS

International Preliminary Report on Patentability dated Sep. 11, 2014 issued in corresponding International patent application No. PCT/SE2013/050771.

* cited by examiner

TRANSMISSION CONTROL SYSTEM

CROSS-REFERENCE TO RELATED APPLICATIONS

The present application is a 35 U.S.C. §§371 National Phase conversion of PCT/SE2013/050771, filed Jun. 26, 2013, which claims priority of Swedish Patent Application No. 1200393-5, filed Jun. 27, 2012, the contents of which are incorporated by reference herein. The PCT International Application was published in the English language.

TECHNICAL FIELD

The present invention relates to a method for choosing a transmission mode and to a system for choosing a transmission mode.

The present invention also relates to a computer program and a computer program product which implement the method according to the invention.

BACKGROUND

For motor vehicles, such as, for example, cars, trucks and buses, fuel cost represents a significant expense for the owner or user of the vehicle. For a haulage company, for example, apart from the cost of procurement of the vehicle, the main items of expenditure for the running of a vehicle are constituted by pay to the driver of the vehicle, costs of repairs and maintenance, and fuel for propulsion of the vehicle. The fuel cost can have a very large impact on profitability for the haulage company. Hence, a number of different systems have been developed in order to reduce fuel consumption, such as, for example, fuel-efficient engines and fuel-saving speed control devices.

FIG. 1 shows a schematic representation of a drive train in a vehicle 100. The drive train comprises an internal combustion engine 101, which is connected in a conventional manner, via an output shaft 102 from the internal combustion engine 101, usually via a flywheel, to an input shaft 109 of a gearbox 103 by means of a clutch 106. The clutch 106 can be constituted, for example, by an automatically controlled clutch, and is controlled by the control system of the vehicle via a control unit 700 (FIG. 7). The control unit 700 can also control the gearbox 103.

The gearbox 103 is here illustrated schematically as a unit. However the gearbox 103 can also physically consist of a plurality of interacting gearboxes, for example a range gearbox, a main gearbox and a split gearbox, which are arranged along the drive train of the vehicle. The gearbox can comprise a suitable number of gear positions. In contemporary gearboxes for heavy duty vehicles there are usually twelve forward gears, two reverse gears and a neutral gear position. If the gearbox 103 physically consists of a plurality of part gearboxes according to the above, these twelve forward gears are distributed amongst two gears in the range gearbox, three gears in the main gearbox and two gears in the split gearbox, which together constitute twelve gear positions (2×3×2=12). The vehicle 100 further comprises drive shafts 104, 105, which are connected to the drive wheels 110, 111 of the vehicle and are driven by an output shaft 107 from the gearbox 103 via an axle gearing 108, such as, for example, a conventional differential.

The vehicle 100 further comprises a variety of different braking systems, such as a conventional service braking system, which can comprise, for example, brake disks with associated brake linings (not shown) arranged next to each wheel.

The engine 101 can be controlled on the basis of instructions from a speed control, in order to maintain a constant actual vehicle speed and/or vary the actual vehicle speed so that a fuel consumption which is optimized within reasonable speed limits is obtained. The engine 101 can also be controlled by a driver of the vehicle.

During the driving of a vehicle, the gear selection has a large influence on the fuel consumption, since the engine speed is directly dependent on this gear selection. Previously known solutions have had problems with determining at what point downshifts should be made, at the same time as they have sometimes led the vehicle to fall below a lowest permitted speed $v_{min}$. This has had the effect that the gear selection, due to drivability reasons, has not been able to be calibrated so as to achieve sufficiently low engine speed and thus to be fuel-efficient, since such calibration attempts for previously known solutions have led to belated downshifts and loss of speed.

In situations when a currently utilized transmission mode is operating at its maximum torque, the actual vehicle speed $v_{act}$ has traditionally been allowed to fall prior to the execution of a downshift to a lower transmission mode. For example, in an economy mode ("eco") for the gear selection, the downshift has previously been delayed for quite a long time. This is a fuel-efficient way of driving the vehicle, since the engine speed is held down as far and as long as possible. One problem is, however, that on the hills where a downshift to a lower transmission mode must anyway be made, this manner of driving the vehicle is perceived by the driver as unintelligent and not intuitively pleasing. The result is that the previously known systems are at risk of gaining limited use.

In descents, for example, or in situations in which the vehicle must reduce its actual speed $v_{act}$, fuel savings have historically been made by a reduced request for positive engine torque, alternatively with the aid of dragging. The reduced request for positive engine torque means that the driving force in the direction of travel, which the internal combustion engine delivers via the drive wheels, is reduced, for example by reduced fuel injection in the engine 101, thereby reducing the fuel consumption. Dragging means driving the vehicle with closed drive train, that is to say with the combustion engine 101 connected to the drive wheels 110, 111 of the vehicle, at the same time as the fuel supply to the internal combustion engine 101 is shut off.

One way of further lowering the fuel consumption is to coast the vehicle by, as described below, either utilizing a neutral gear position in the gearbox 103 or opening the clutch. Through the use of coasting, a still lower fuel consumption than with dragging is achieved, since engine braking is eliminated, at the same time as the engine speed is reduced to a minimum. Coasting can be realized with the engine 101 running or shut off. If the engine 101 is running, coasting is only profitable in a conventional vehicle if the vehicle is not braked or will not need to be braked.

Previously known solutions have had problems with determining at what point the coasting should be suspended in order to obtain a pliable and flexible function which is also imperceptible in terms of comfort, that is to say when it is time to, at an intuitively correct moment, engage a physical gear in the gearbox and/or close the clutch, as well as to determine when the coasting has to be suspended to prevent the vehicle from falling below the lowest permitted speed $v_{min}$.

Previously known solutions have thus chosen transmission modes in the vehicle in a manner which is neither optimal from the perspective of drivability nor comfort. The transmission modes here comprise coasting, as well as gear positions in the gearbox. This has led to low driver acceptance for low engine speed gear selection and coasting, which has led to a low level of use of the function.

SUMMARY OF THE INVENTION

One object of the present invention is to safely drive the vehicle with an overall reduced fuel consumption by improving the drivability and comfort of the vehicle, thereby increasing the driver acceptance and level of use of low-speed gear selection and coasting.

Through the use of the present invention, the object of obtaining an overall reduced fuel consumption is achieved by a controlled and exact control of the choice of transmission mode to utilize in the vehicle. A belated change of transmission mode, for example a belated suspension of coasting or a belated downshift, can thus be avoided through the use of the invention. At the same time, any fall below a lowest permitted speed $v_{min}$ and/or a set speed $v_{set}$ for a speed control is precluded. Hence the drivability for the chosen transmission mode increases and an increased driver acceptance for more fuel-efficient choices of transmission mode is obtained.

From a drivability aspect, given that downshifting must take place so as not to end up below the lowest permitted speed $v_{min}$, the driver would prefer the system to downshift before the vehicle reaches this lowest permitted speed $v_{min}$, but ideally before the vehicle has lost any speed.

When the invention is utilized, coasting can be suspended and/or downshifting to another physical gear position in the gearbox can be made directly prior to the existence of a force deficit in said vehicle. Since the invention can decide how much the speed falls during said force deficit, the invention will only downshift or suspend coasting prior to the emergence of such force deficits leading to the speed falling below the smallest permitted speed $v_{min}$. Utilization of a lowest possible engine speed and/or a longest possible coasting period is hereby obtained as long as this is suitable, which gives increased fuel saving while at the same time minimizing the risk of underspeed.

According to the invention, the choice of transmission mode can be made more exactly than with previously known solutions, since it is based on one or more simulations $v_{sim}$ of future speed profiles for the road section ahead of the vehicle. This results in the system having very good control over how the vehicle will perform over the course of the road section ahead of the vehicle, whereby a very exact prediction is made of whether the driving situation would lead to a force deficit and/or underspeed over the course of the road section ahead. This exact prediction enables the system to make a correct decision on whether to continue to utilize a transmission mode or to choose a lower transmission mode.

Hence, coasting can be controlled such that it is utilized essentially throughout the period in which it is applicable, that is to say usable. Correspondingly, the gear selection is controlled such that a higher gear is utilized essentially throughout the period in which it is applicable. Since the coasting and/or the higher gear is utilized in a manner which is intuitively correct for the driver, the appreciation of the driver for the function increases, which in turn increases the degree of use of the function. In other words, the fuel consumption is lowered by virtue of the fact that the control of the choice of transmissions is made correctly more often. This increase in the correct control of the transmission choice can also result in an increased use of the control system by the driver, which further reduces the fuel consumption.

Through the use of the present invention, a very exact and well-informed choice of whether a previously utilized transmission mode shall continue to be applied or whether a lower transmission mode shall be utilized over the course of a road section ahead of the vehicle is obtained, whereby the engine speed becomes as low as possible with maintained drivability, which saves fuel.

The present invention can be implemented without adding much to the complexity in the vehicle, at least in part since the invention can make use of data which are already available in other systems in the vehicle, such as road slope information to which a speed control in the vehicle has access.

The present invention can be utilized both in pedal driving, that is to say where the driver himself regulates the requesting of torque from the engine, and in speed control driving. The term pedal driving here and in this document comprises essentially all types of control system which are suited to regulating the torque demand, such as, for example, a gas pedal or a manual throttle device.

BRIEF DESCRIPTION OF THE DRAWINGS

The invention will be illustrated in greater detail below on the basis of the appended drawings, in which identical reference symbols are used for identical parts, and wherein.

DESCRIPTION OF PREFERRED EMBODIMENTS

Figure 1:
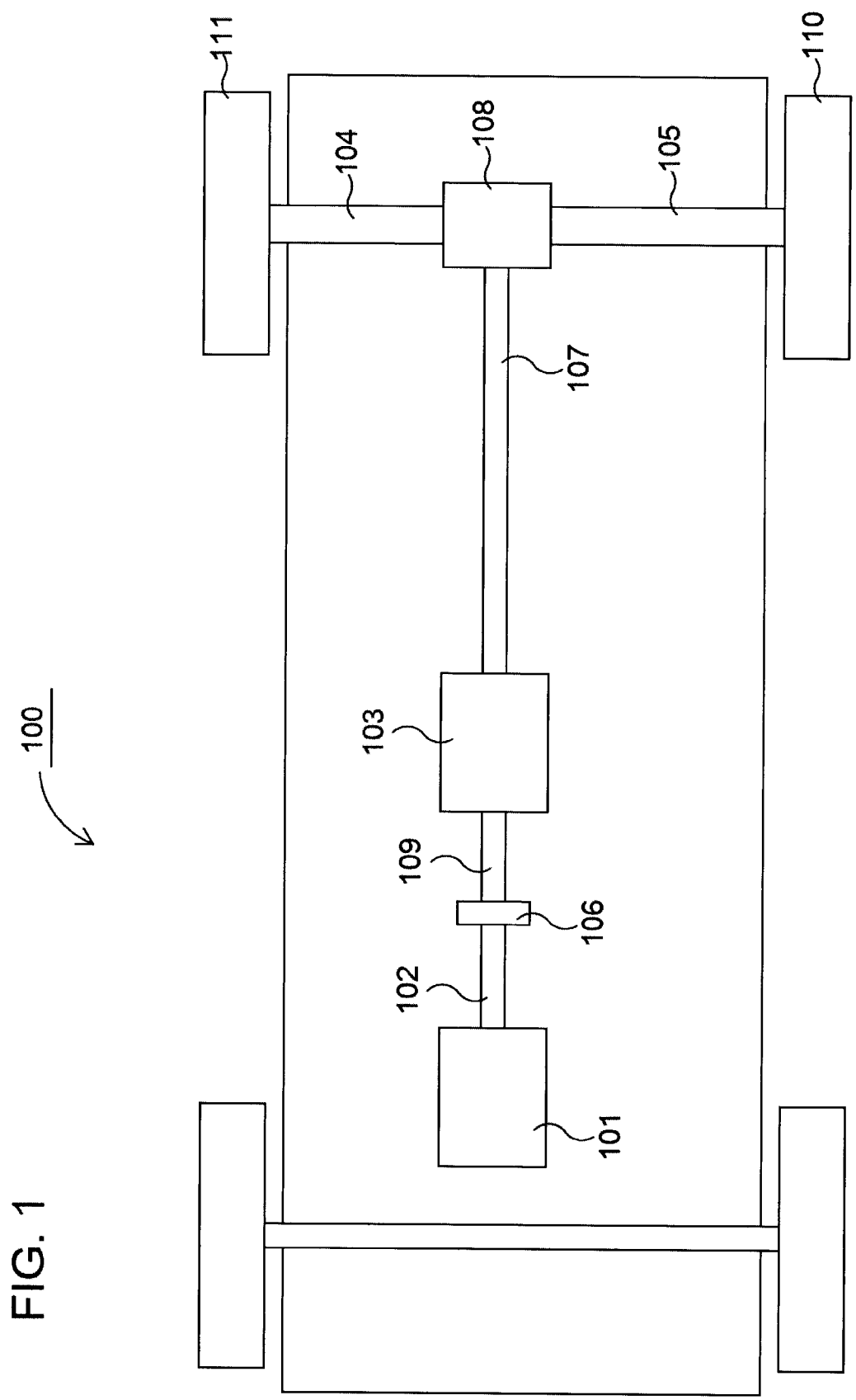
FIG. 1 shows in schematic representation parts of an exemplary vehicle.
Figure 2:
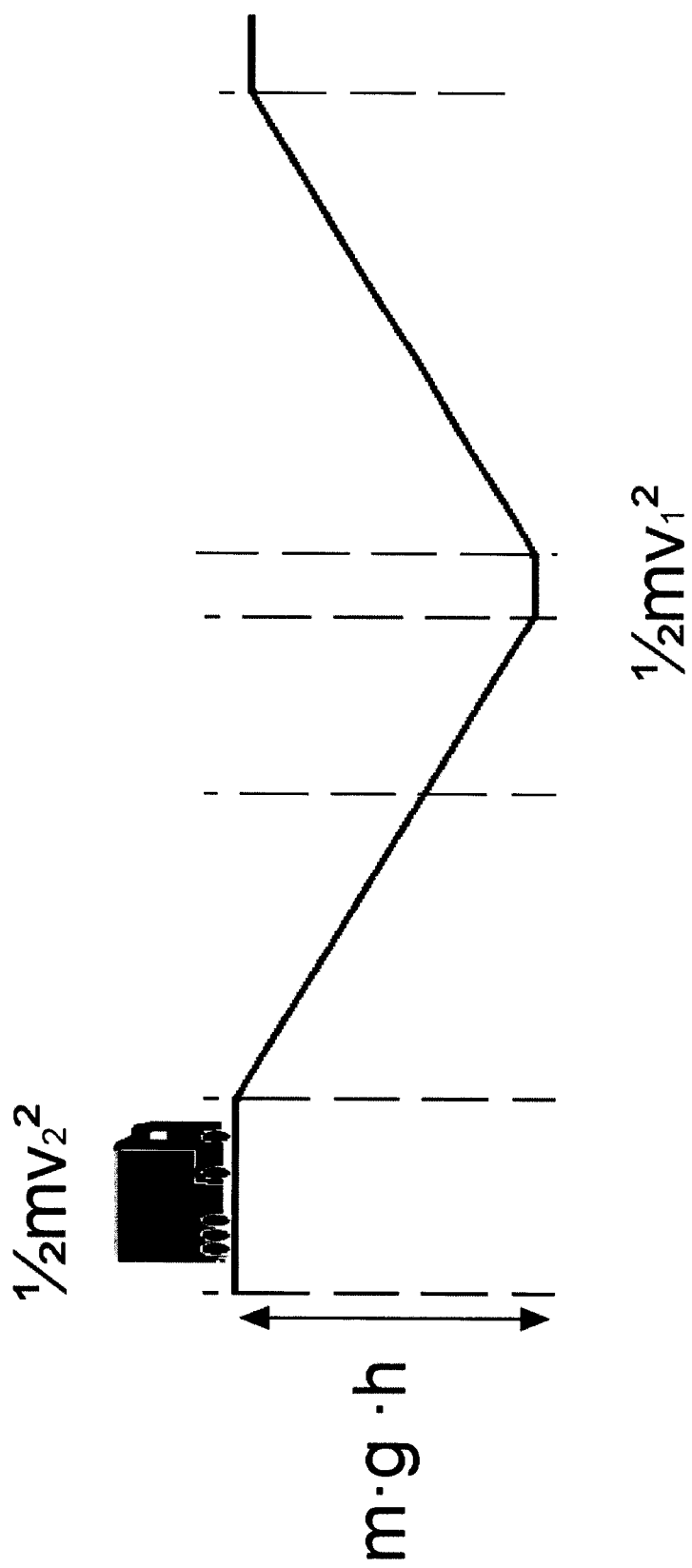
FIG. 2 shows in schematic representation a driving situation.

FIG. 2 shows in schematic representation an example of a driving situation, a descent followed by an ascent, which can precede a driving situation in which the present invention is utilized and in which coasting can be activated. Coasting can also be applied in other driving situations, for example in the event of an increase in speed, which can occur on a flat road. For pedagogical reasons, however, the driving situation in FIG. 2 will here be used to describe principles for coasting. The present invention can be applied, for example, when an undemanding driving situation transforms into a more demanding driving situation, whereupon a change to a lower transmission mode shall be made.

For the vehicle in FIG. 2, an energy relationship can be established for the driving situation:

$$mgh = (\tfrac{1}{2}mv_2^2 - \tfrac{1}{2}mv_1^2) + (F_{air} + F_{rr} + F_{eng} + F_{gb} + F_{axle/nav}) \cdot s \quad \text{(equation 1)}$$

in which:
mgh is the potential energy of the vehicle;
$\tfrac{1}{2}mv_2^2$ is the kinetic energy of the vehicle up on the top of the hill;
$\tfrac{1}{2}mv_1^2$ is the kinetic energy of the vehicle at the bottom of the hill;
$F_{air}$ is the air resistance of the vehicle;
$F_{rr}$ is the rolling resistance of the vehicle;
$F_{eng}$ is the engine friction;
$F_{gb}$ is the gearbox friction;

$F_{axle/nav}$ is friction in rear axle, seals and wheel bearings; and s is the traveled distance between the top and the bottom of the hill.

As can be seen from equation 1, a number of forces $F_{air}$, $F_{rr}$, $F_{eng}$, $F_{gb}$, and $F_{axle/nav}$ act against the motion of the vehicle.

Figure 3:
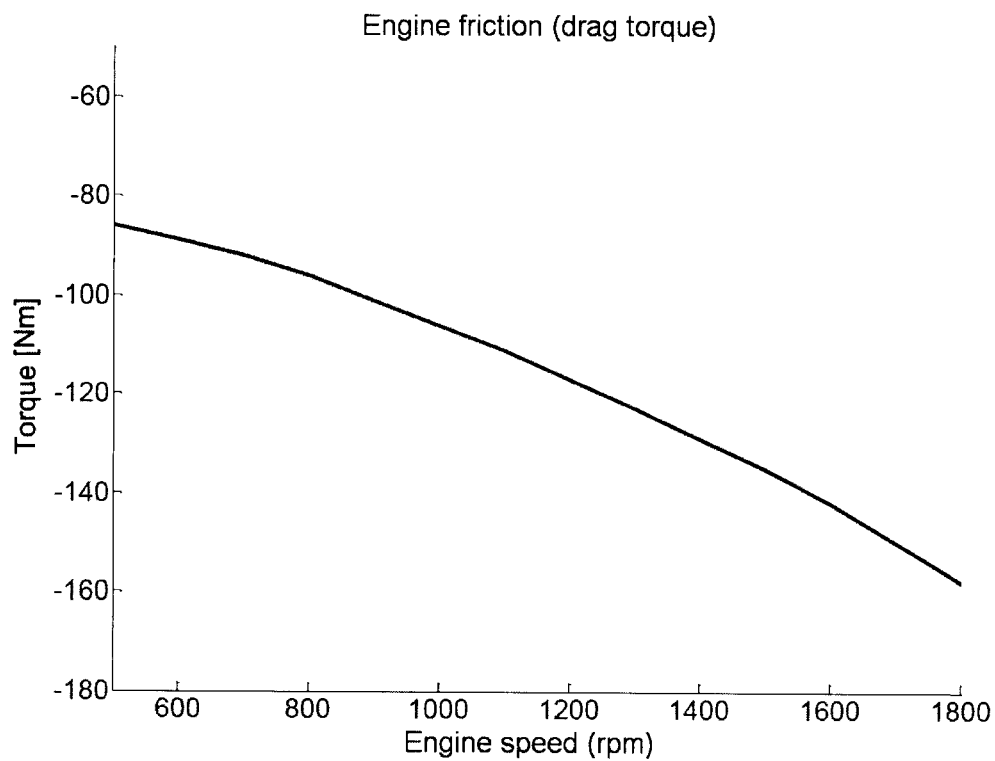
FIG. 3 shows a graph representing engine friction as a function of engine speed.

FIG. 3 shows an example of engine friction for a truck engine. It can here be seen that the negative torque corresponding to the engine friction $F_{eng}$, which inhibits the motion of the vehicle, increases with increased rotation speed for the engine 101 (note that the y-axis has negative gradation in FIG. 3). Conversely, reduced rotation speed for the engine gives reduced force for the engine friction $F_{eng}$, that is to say reduced negative torque, which is exploited by the present invention.

Coasting in this document means that the engine 101 of the vehicle is disengaged from the drive wheels 110, 111 of the vehicle, i.e. that the drive train is opened. This disengagement of the drive wheels 110, 111 from the engine 101, also referred to as opening of the drive train, can be achieved, for example, by setting the gearbox 103 in a neutral position or by opening the clutch 106. In other words, essentially no force is transmitted from the engine 101 to the drive wheels 110, 111 during the coasting. Disengagement of the engine 101 from the drive wheels 110, 111 of the vehicle 100 when the vehicle 100 is in motion is thus referred to in this document as coasting.

Coasting brings about a considerable reduction in the forces acting against the motion of the vehicle, since the force for the engine friction $F_{eng}$ diminishes to a value essentially equal to zero (0) during coasting. Hence, coasting can considerably lower the fuel consumption by virtue of this reduced resistance against the vehicle. In certain cases of coasting, idling fuel would have to be supplied to the engine, however, to prevent the engine from stalling, while in other cases the engine can be allowed to stall.

The result is that, from a fuel aspect, it is often more advantageous to drive the vehicle with an open drive train, that is to say in coasting mode, than with dragging, that is to say when the drive train is closed at the same time as the fuel supply to the engine 101 is shut off. The reason for this is that the limited quantity of fuel which is required to keep the internal combustion engine running when the internal combustion engine is disengaged is counterbalanced by the fact that the vehicle can continue with disengaged internal combustion engine for a longer distance, for example after a downslope has been negotiated. This is due, inter alia, to the fact that the vehicle will reach a higher speed on, for example, the downslope when driven with disengaged internal combustion engine compared with when the vehicle is driven with closed drive train without fuel supply.

In coasting, moreover, the force which inhibits the driving of the vehicle will be lower when the internal combustion engine of the vehicle is disengaged from the drive shaft, since there is no engine brake force inhibiting the progress of the vehicle. This makes the vehicle decelerate more slowly, for example, when the vehicle reaches the end of the downslope, which in turn means that coasting can often be utilized for a relatively long distance after, for example, an end of a descent. A considerable reduction in fuel consumption is hereby obtained.

According to the present invention, a determination is made as to when, that is to say at what moment, a change to a lower transmission mode shall be made, for example by the suspension of a coasting or by the execution of a downshift from a higher physical gear position to a lower physical gear position, and additionally what effect this change in transmission mode would have on the actual speed profile of the vehicle for a road section.

In order to be able to make this determination, at least one future speed profile $v_{sim}$ for the actual speed of the vehicle for a road section ahead of the vehicle is simulated on the basis at least of a road slope for the road section.

Thus, the simulation is conducted such that it is based on the current position and situation of the vehicle and looks forward over the road section, wherein the simulation is made on the basis of a road slope for the road section.

For example, the simulation can be conducted in the vehicle at a predetermined frequency, such as for example at the frequency of 1 Hz, which means that a new simulation result is ready every second. The road section for which the simulation is conducted comprises a predetermined section ahead of the vehicle, in which this, for example, can be 1-4 km long. The road section can also be seen as a horizon ahead of the vehicle for which the simulation is to be conducted.

Apart from the above-stated parameter of road slope, the simulation can also be based on one or more of the following: a driving method, a current actual vehicle speed, at least one engine characteristic, such as maximum and/or minimum engine torque, a vehicle weight, an air resistance, a rolling resistance, an upshift in the gearbox and/or the drive train, a wheel radius.

The road slope on which the simulations are based can be obtained in a number of different ways. The road slope can be determined on the basis of map data, for example from digital maps comprising topographical information, in combination with positioning information, such as, for example GPS information (Global Positioning System). With the aid of the positioning information, the position of the vehicle in relation to the map data can be determined so that the road slope can be extracted from the map data.

In many present day speed control systems, map data and positioning information are utilized in the speed control. Such systems can then provide map data and positioning information to the system for the present invention, the effect of which is that the added complexity for the determination of the road slope is minimized.

The road slope on which the simulations are based can also be obtained by estimating the road slope encountered by the vehicle in the simulation instance. There are many ways of estimating this road slope, for example on the basis of one or more of the following: an engine torque in the vehicle, an acceleration for the vehicle, on an accelerometer, on GPS information, on radar information, on camera information, on information from another vehicle, on road slope information and positioning information stored earlier in the vehicle, or on information obtained from a traffic system related to said road section. In systems in which information exchange between vehicles is utilized, road slope estimated by one vehicle can also be made available to other vehicles, either directly, or via an intermediate unit such as a database or the like.

The simulations can be conducted on the basis of an assumption of utilization of a possible physical gear position for the gearbox. For the possible gear position, such as for each gear in the gearbox 103, there are parameters related to each gear, such as gear ratio, efficiency and maximally permitted torque, as well as parameters related to the drag torque and maximum torque of the engine as a function of engine speed. A physical gear position can in this document constitute essentially any gear whatsoever in the gearbox 103. One or more of these parameters can constitute input data for simulation of the future speed profile $v_{sim}$.

According to the present invention, a time period $T_{appl}$ is determined ahead of the vehicle, in which a currently utilized transmission mode is deemed to be applicable during this time period $T_{appl}$. The determination of the time period $T_{appl}$ is based on at least one simulated future speed profile $v_{sim}$, which has been simulated in the same way as described above. The determination of the time period $T_{appl}$ is realized such that it ensures that a lower transmission mode is chosen before a lowest permitted speed $v_{min}$ defined for said road section and/or a set speed $v_{set}$ for a speed control is reached.

After this, an evaluation is conducted of whether a lower transmission mode than the currently used transmission mode shall be chosen. According to the present invention, a lower transmission mode shall be chosen if the time period $T_{appl}$ for which the current transmission mode is applicable is shorter than a first threshold period $T_{lim}$. Thus a lower transmission mode shall be chosen if $T_{appl} < T_{lim}$.

Figure 5:
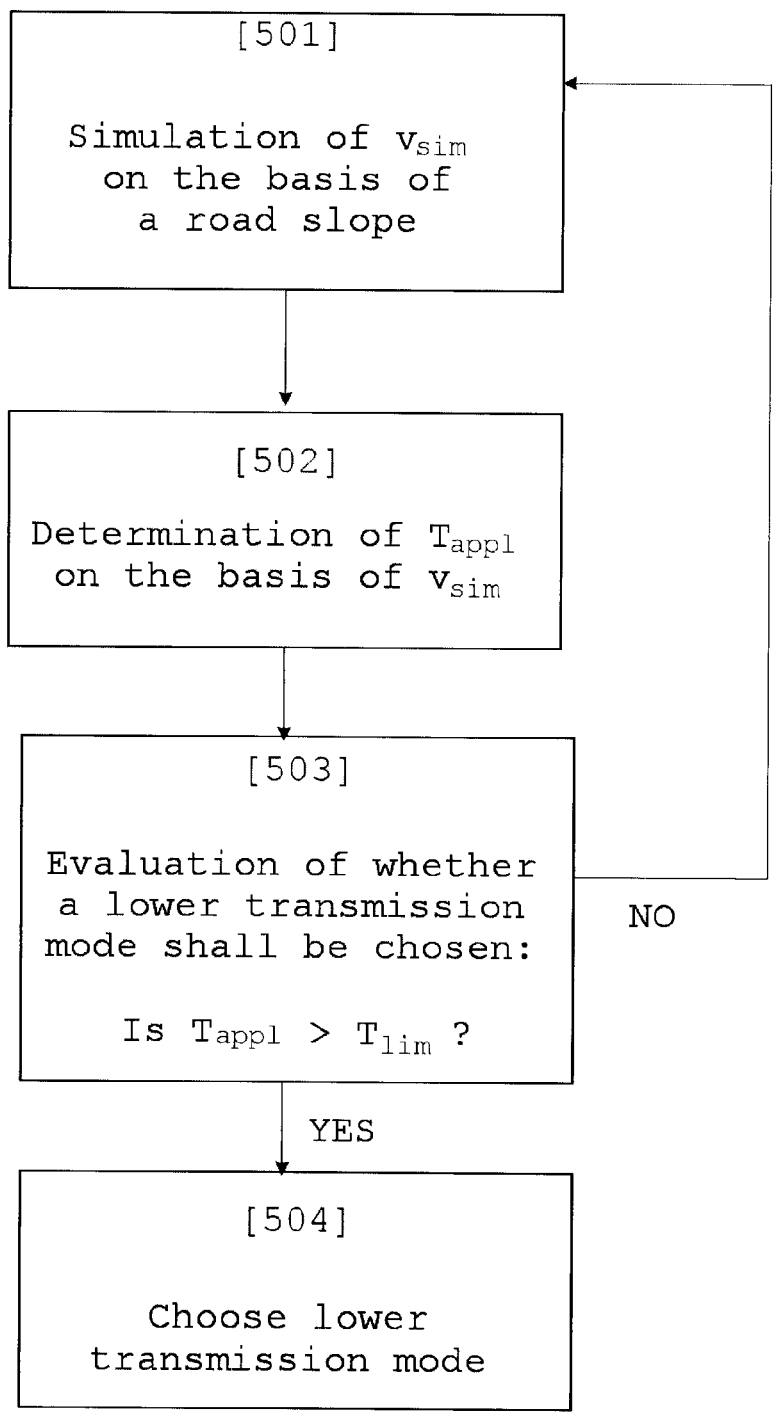
FIG. 5 shows a flowchart for the method according to the invention.

FIG. 5 shows a flowchart for the method according to the present invention. In a first step 501 of the method, a simulation of at least one future speed profile $v_{sim}$ is conducted for the road section ahead of the vehicle 100, in which the simulation of the future speed profile $v_{sim}$ is based on a road slope for the road section. The simulation is conducted at the first moment $T_1$, when the road section lies ahead of the vehicle 100, and computes an actual speed $v_{act}$ for the vehicle over the course of the coming road section.

According to one embodiment, account is also taken in the simulations of an adopted driving method, in which this driving method can comprise one or more of speed control driving, driving with drag torque, driving according to an arbitrary torque profile, and gas pedal driving. The simulation can also take account one or more vehicle parameters, such as, for example, the weight of the vehicle.

In a second step 502 of the method, the time period $T_{appl}$ is determined on the basis of at least one simulated future speed profile $v_{sim}$. The time period $T_{appl}$ corresponds to the maximum time for which the current transmission mode, that is to say the transmission mode which is utilized when the simulation is made, can continue to be utilized without the actual vehicle speed $v_{act}$ falling below the lowest permitted speed $v_{min}$ and/or a set speed $v_{set}$ for a speed control.

An evaluation is then conducted, in a third step 503, of whether a lower transmission mode than the currently used transmission mode shall be chosen. According to the present invention, a lower transmission mode shall be chosen if the time period $T_{appl}$ for which the current transmission mode is applicable is shorter than a first threshold period $T_{lim}$. Thus a lower transmission mode shall be chosen if $T_{appl} < T_{lim}$, which is realized in a fourth step 504 of the method. If the time period $T_{appl}$ is as long as or longer than the first threshold period $T_{lim}$, the process returns to the first step 501, in which at least one new simulation is made.

The method thus identifies whether an underspeed below the lowest permitted speed $v_{min}$ according to the at least one future speed profile $v_{sim}$ will occur for the vehicle following the expiry of the time period $T_{appl}$, and evaluates whether this underspeed lies so close to the simulation instance in time that a lower transmission mode shall be chosen. The risk of the actual vehicle speed $v_{act}$ falling below the lowest permitted speed $v_{min}$ is hereby effectively avoided.

The choice of the transmission mode to be utilized in the vehicle, that is to say the fourth step 504, is realized, according to one embodiment, by the control system itself. According to another embodiment, the control system, with the aid of a display unit, presents to the driver information indicating that a change to a lower transmission mode is suitable, whereafter the driver has an opportunity to choose whether the presented change of transmission mode shall be effected or not.

According to the present invention, by basing the choice of transmission mode to be utilized in the vehicle 100 on a simulation of one or more future speed profiles $v_{sim}$, a factually informed choice of transmission mode can be made. Through the use of the invention, the likelihood that a suspension of coasting and/or that a downshift is correct is increased, since the simulations are made over a longer time period. Previously known solutions have been based on the situation at the precise point when decisions have been taken, which has often led to either the suspension of coasting and/or to such a late execution of a downshift that the lowest permitted speed $v_{min}$ has already been passed.

According to one embodiment of the invention, it is determined in the evaluation whether a higher drive wheel torque than is currently available in the current transmission mode will need to be requested of the engine 101 following the expiry of the time period $T_{appl}$ in order for an actual speed $v_{act}$ of the vehicle to remain higher than the lowest permitted speed $v_{min}$ defined for the road section.

According to one embodiment, the first threshold period $T_{lim}$ should have a length such that the choice of the lower transmission mode has time to be made and time to give a torque in the lower transmission mode without the lowest permitted speed $v_{min}$ and/or a set speed $v_{set}$ for a speed control in the vehicle being fallen below.

It is hereby ensured that the actual speed $v_{act}$ of the vehicle does not become too low over the course of the road section, that is to say does not become lower than the lowest permitted speed $v_{min}$ and/or a set speed $v_{set}$, which is much appreciated by drivers of these vehicles, as well as by traffic surrounding the vehicle.

According to one embodiment, the at least one future speed profile $v_{sim}$ comprises a simulated future speed profile $v_{sim\_coast}$ related to coasting. The vehicle has here applied coasting prior to the road section, that is to say before the simulation is effected. In this document, coasting constitutes an imaginary/fictitious highest gear position, and the choice of a lower transmission mode constitutes a suspension of this coasting. In other words, a downshift is here made from an imaginary/fictitious highest gear position into a physical gear position, in which the physical gear position, for example, can constitute any one of the higher gears in the gearbox 103.

Where the choice of a lower transmission mode, according to one embodiment, constitutes a downshift from a higher physical gear position into a lower physical gear position for the gearbox 103 in the vehicle, the change of transmission mode to a lower transmission mode constitutes a conventional downshift. This embodiment is generally applicable to the physical gears of the gearbox, in which the higher physical gear position can be constituted by essentially all the gear positions of the gearbox, apart from the lowest gear position in the gearbox.

Figure 4:
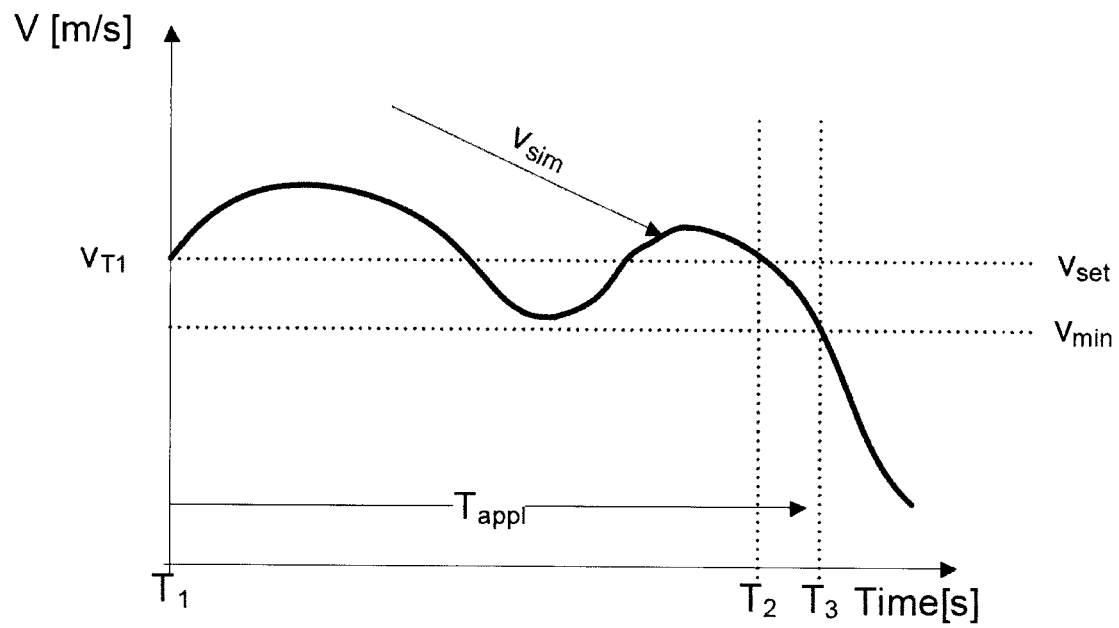
FIG. 4 shows an example of a simulation according to the invention.

In the non-limiting example of FIG. 4, an illustration is shown of a simulated future speed profile $v_{sim}$. Prior to the road section, that is to say before the first moment $T_1$, the current transmission mode, that is to say the transmission mode utilized in the simulation, has here been utilized in the vehicle. At a second moment $T_2$, the simulated future speed profile $v_{sim}$ here falls below the set speed $v_{set}$ immediately before a third moment $T_3$, when the future speed profile $v_{sim}$ falls below a lowest permitted speed $v_{min}$ defined for the road section.

According to one embodiment of the invention, the time period $T_{appl}$, which will subsequently be utilized to evaluate whether a lower transmission mode shall be used, starts at a first moment $T_1$, when said simulation is conducted, and ends at the third moment $T_3$, when the future speed profile $v_{sim}$ falls below the lowest permitted speed $v_{min}$, $T_{appl}=T_{13}$. Thus if $T_{13}<T_{lim}$, then a lower transmission mode shall be chosen. This embodiment has an advantage in that the transmission mode utilized in the simulation can be utilized as long as possible without the lowest permitted speed $v_{min}$ being fallen below before or after the gearshift to a lower transmission mode.

According to one embodiment of the present invention, the time period $T_{appl}$ starts at the first moment $T_1$, when the simulation is conducted, but ends at a second moment $T_2$, which constitutes a moment immediately before the third moment $T_3$, at which the at least one future speed profile $v_{sim}$ falls below the set speed $v_{set}$ for the speed control in the vehicle. As has been described above, the at least one future speed profile $v_{sim}$ falls below the lowest permitted speed $v_{min}$ at the third moment $T_3$. Thus, here $T_{appl}=T_{12}$ and a lower transmission mode shall be chosen if $T_{12}<T_{lim}$. This embodiment has an advantage in that the vehicle only falls below the set speed $v_{set}$ in those cases where there is no need for a gearshift to a lower transmission mode to keep the speed above the lowest permitted speed $v_{min}$. In practice this means that it is possible to remain in the current transmission mode over shorter distances without needing to change transmission mode. But in those cases where there will be a need to change transmission mode, the gearshift is already carried out before the vehicle ends up below the set speed $v_{set}$, which is perceived by a driver as a sensible and, also from the drivability aspect, positive action of the function.

The choice of transmission mode according to the present invention can be utilized in the manual requesting of torque from the engine 101, that is to say in pedal driving, or in speed control driving.

According to one embodiment, the magnitude of the lowest permitted speed $v_{min}$, that is to say the level of the lowest permitted speed $v_{min}$, is related to a current actual speed $v_{act}$ for the vehicle.

According to one embodiment, the magnitude of the lowest permitted speed $v_{min}$ can be determined at least partially on the basis of information related to a speed control system in said vehicle, for example on the basis of a set speed $v_{set}$, that is to say a driver-selected speed, for a speed control system, or on the basis of a reference speed $v_{ref}$ which is utilized by said speed control system to control a speed regulator. The determination of the lowest permitted speed $v_{min}$ can also be realized by the speed control system and made available to the system for the present invention.

According to one embodiment of the present invention, the system according to the present invention is integrated at least partially with the speed control logic of a speed control system in the vehicle. The lowest permitted speed $v_{min}$ can then be controlled by the speed control logic of the vehicle. For example, an intelligent speed control lowers the vehicle speed in advance of descents, since the vehicle will accelerate anyway during the descent. According to this embodiment, the speed control can also initiate a lowering of the lowest permitted speed $v_{min}$ and thereby prolong the time in the coasting mode and/or in the possible gear for the vehicle. This lowering of the lowest permitted speed $v_{min}$ can be achieved, for example, if the lowest permitted speed $v_{min}$ is related to the reference speed $v_{ref}$ which is the target value which is lowered by the speed control in the face of descents, wherein the regulation of the lowest permitted speed $v_{min}$ is obtained automatically.

Speed limit values which are utilized by the present invention, that is to say values for the lowest permitted speed $v_{min}$, can generally be determined on the basis of a number of different methods. For example, these limit values can be fed in by the driver, constitute a percentage of an actual speed $v_{act}$ for the vehicle, constitute a percentage of a set speed $v_{set}$ for a speed control system in the vehicle and/or be based on historical driving of the vehicle. The historical driving can be taken into account, for example, by utilizing an adaptive algorithm which is updated during the progress of the vehicle.

As a non-limiting example it can be cited that the following values could be utilized for $v_{min}$ in this document:

$$v_{min}=82 \text{ km/h or } v_{min}=0.98 \times v_{set} \text{ km/h}.$$

As a non-limiting example it can be cited that the first time period $T_{12}$ could have the length $T_{12}=10$ seconds.

The lowest permitted speed $v_{min}$ can be altered dynamically and can have different values for different transmission modes.

As has been described above, road slope can be determined on the basis of map data and positioning information. If such data are not available, the simulations can be based on estimates of the road slope encountered by the vehicle in the simulation instance. This places greater demands on the magnitude of the lowest permitted speed $v_{min}$, since the simulations are less exact and more diverse in magnitude. Moreover, according to one embodiment of the invention, the length of the horizon, that is to say length of the road section, can be shortened in order to counter these variations.

When the road slope for the road section is approximated with the road slope encountered by the vehicle in the simulation itself, an optimal result will be obtained in the case of a gentle descent. Gentle descents are ideal for coasting if the road slope, for example, is such that the simulated future speed profile $v_{sim}$ lies within its permitted range, between the lowest permitted speed $v_{min}$ and the highest permitted speed $v_{max}$.

One advantage of simulating future speed profiles on the basis of current slope is that the same algorithm can be used both for roads and vehicles in which there is no access to future road slope and for roads and vehicles in which there is access to future road slope. Moreover, the simulation makes use of speed-dependent terms, such as, for example, air resistance and engine torque, so that a good estimate of how the vehicle will behave from this point forward is obtained even without knowledge of the future road slope.

Figure 6:
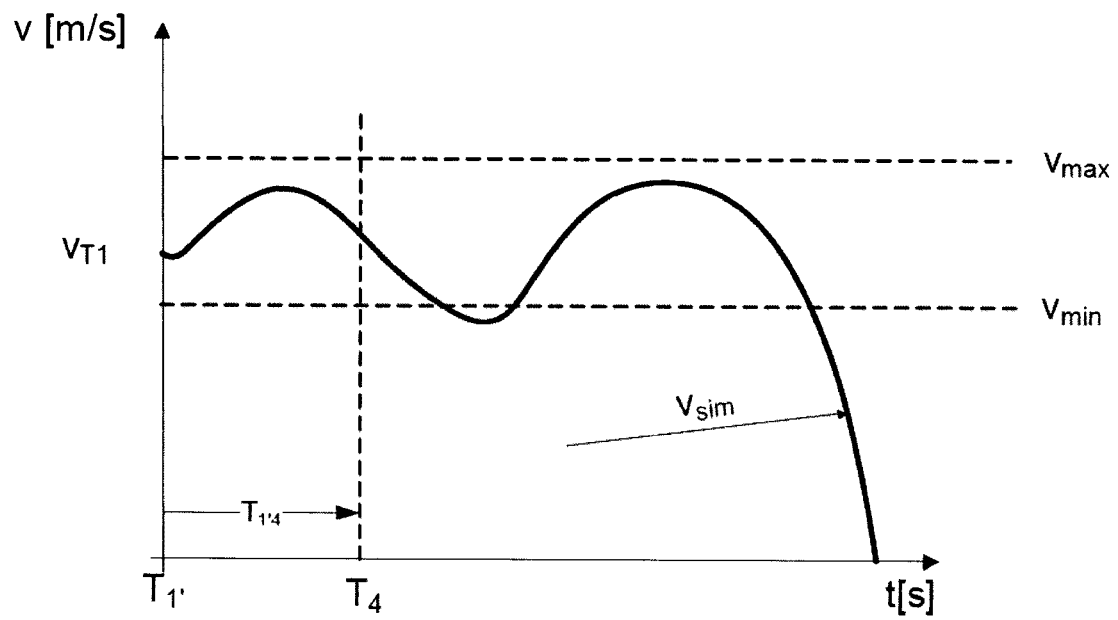
FIG. 6 shows an example of a simulation according to the invention.

According to one embodiment of the invention, the transmission mode, for example coasting, which has been applied by the vehicle prior to the road section, that is to say before the first moment $T_1$, or a transmission mode which will be applied over the course of or after the road section, has been chosen, or will be chosen, by conducting one or more simulations of future speed profiles $v_{sim}$ for the road section ahead of the vehicle 100, in which the simulations for each of the at least one future speed profiles $v_{sim}$ are based on a road slope and on a transmission mode for the vehicle. An example of such a simulation is shown in FIG. 6. Here, one or more simulations for gears in the gearbox 103, for open clutch 106, and/or for neutral gear position in the gearbox 103 can be conducted. According to one embodiment, account is also taken in the simulations of an adopted driving method, in which this driving method can comprise one or more of speed control driving, driving with drag torque, driving according to an arbitrary torque profile, and gas pedal driving. The simulation can also take account of one or more vehicle parameters, such as, for example, the weight of the vehicle. In this document, applicable means usable.

Next, the applicability for the transmission modes which are related to the at least one simulated future speed profiles $v_{sim}$ is evaluated. A transmission mode is here deemed applicable if its related simulated future speed profile $v_{sim}$ is greater than the above described lowest permitted speed $v_{min}$ throughout the third time period $T_{1'4}$, which extends from a further first moment $T_{1'}$ when the simulations are conducted, to the fourth, later moment $T_4$. The further first moment $T_{1'}$ does not here normally coincide with the above-stated first moment $T_1$.

After this, a transmission mode is chosen for utilization on the basis of the evaluation. Typically, a transmission mode which has been deemed applicable is chosen. According to one embodiment of the invention, a transmission mode for coasting is chosen, if such a transmission mode has been deemed applicable. Otherwise, a transmission mode for the gear position which has been deemed applicable is chosen. The choice of the transmission mode to be utilized in the vehicle is made, according to one embodiment, by the control system itself. According to another embodiment, the control system presents the suitable transmission mode to the driver with the aid of a display unit, whereafter the driver has an opportunity to choose whether the presented transmission mode shall be utilized or not.

According to one embodiment, the fourth moment $T_4$ is chosen such that the third time period $T_{1'4}$ corresponds to a smallest/shortest permitted time period for which a gear should be utilized in order to avoid an inconsistent gearshift. Inconsistent gearshift here comprises shifts between different gears/transmission modes at relatively high frequency. Thus the third time period $T_{1'4}$ has a length which ensures that the driver is not subjected to unnecessarily frequent and irritating gearshifts.

As will be appreciated by a person skilled in the art, sequences of choices of transmission mode as are described in connection with FIG. 6, as well as choices of lower transmission mode as are described, for example, in connection with FIG. 5, can be achieved. Sequences of one or more of upshifts, coastings and downshifts can hereby be obtained by utilization of different embodiments of the present invention.

The person skilled in the art will appreciate that a method for choosing a transmission mode according to the present invention can also be implemented in a computer program, which, when it is executed in a computer, instructs the computer to carry out the method. The computer program is usually constituted by a computer program product 703 stored on a digital storage medium, in which the computer program is incorporated in the computer-readable medium of the computer program product. Said computer-readable medium consists of a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 7:
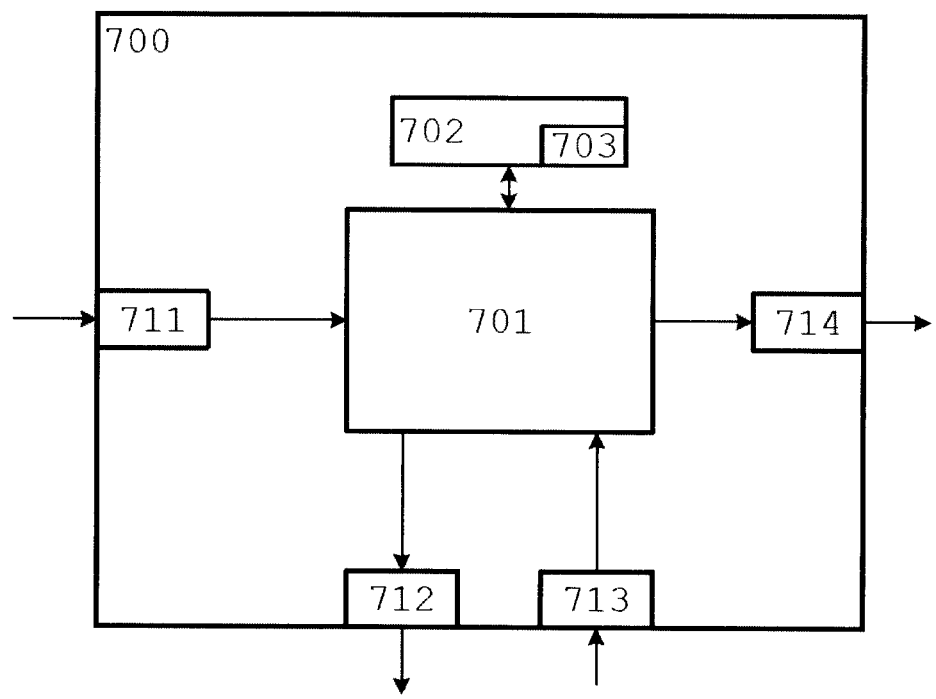
FIG. 7 shows a control unit according to the invention.

FIG. 7 shows in schematic representation a control unit 700. The control unit 700 comprises a computing unit 701, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 701 is connected to a memory unit 702 arranged in the control unit 700, which memory unit provides the computing unit 701 with, for example, the stored program code and/or the stored data which the computing unit 701 requires to be able to perform computations. The computing unit 701 is also arranged to store partial or final results of computations in the memory unit 702.

In addition, the control unit 700 is provided with devices 711, 712, 713, 714 for receiving and transmitting input and output signals. These input and output signals can contain waveforms, impulses, or other attributes which, by the devices 711, 713 for the reception of input signals, can be detected as information and can be converted into signals which can be processed by the computing unit 701. These signals are then made available to the computing unit 701. The devices 712, 714 for the transmission of output signals are arranged to convert signals received from the computing unit 701 in order to create output signals by, for example, modulating the signals, which can be transmitted to other parts of and/or systems in the vehicle.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 701 and that the above-stated memory can be constituted by the memory unit 702.

Control systems in modern vehicles commonly consist of communication bus systems consisting of one or more communication buses for linking a number of electronic control units (ECUs), or controllers, and various components located on the vehicle. Such a control system can comprise a large number of control units and the responsibility for a specific function can be divided amongst more than one control unit. Thus, vehicles of the shown type often comprise significantly more control units than are shown in FIG. 7, which is well known to the person skilled in the art within the technical field.

In the shown embodiment, the present invention is implemented in the control unit 700. The invention can also, however, be implemented wholly or partially in one or more other control units already present in the vehicle, or in some control unit dedicated to the present invention.

According to one aspect of the invention, a system for choosing a transmission mode in a vehicle is provided, in which the system comprises a simulation unit, arranged to simulate the at least one future speed profile $v_{sim}$ for the road section ahead. This at least one simulation is thus made when the road section lies ahead of the vehicle and on the basis of a road slope and results in an actual speed $v_{act}$ for the vehicle over the course of the road section.

The system also comprises a determining unit, arranged to determine a time period $T_{appl}$ ahead of the vehicle, during which time period $T_{appl}$ a current transmission mode is deemed to be applicable. The determining unit is arranged to base the determination on the at least one future speed profile $v_{sim}$ and to ensure that a lower transmission mode is chosen before a lowest permitted speed $v_{min}$ defined for the road section and/or a set speed $v_{set}$ for a speed control is reached.

The system also comprises an evaluation unit, which is arranged to evaluate whether a lower transmission mode shall be chosen. The evaluation unit is arranged to choose a lower transmission mode if the time period $T_{appl}$ for which the current transmission mode is applicable is shorter than a first threshold period $T_{lim}$, $T_{appl} < T_{lim}$.

The system also comprises, according to one embodiment, a utilization unit, which is arranged to utilize the evaluation conducted by the evaluation unit to choose a transmission mode for the vehicle.

According to one embodiment of the invention, the transmission mode to be used by the vehicle is chosen by the control system.

According to another embodiment of the invention, which is geared toward providing the driver of the vehicle with information to support decision making when driving the vehicle, the utilization unit comprises a display unit. This display unit is arranged to present information indicating that a lower transmission mode should be chosen, and/or which transmission mode shall be chosen. The decision as to which transmission mode shall be used by the driver is thus taken here.

The display unit is arranged and preferably integrated with, or adjacent to, a user interface in the vehicle, with the result that the display of a suitable transmission mode for use is clearly visible to the driver.

The display of the indicators can have a number of different designs. For example, the display is constituted by one or more of indicators for transmission modes, such as signs, numerals, letters, symbols, patterns, figures, colors, animations, and sound.

The system, that is to say the simulation unit, the determining unit, the evaluation unit, and for certain embodiments the utilization unit and/or the display unit, is designed to be able to realize all the above-described embodiments of the method according to the present invention.

The person skilled in the art will appreciate, of course, that speeds and speed limit values which have been quoted in this document have equivalences and can be translated into revolution speeds and revolution speed limit values or torque and torque limit values. Likewise, the person skilled in the art will appreciate that there is a very well-known correlation between distances, times and speeds, so that the herein quoted times and time periods have equivalences in positions and distances.

The person skilled in the art will also appreciate that the system above can be modified according to the different embodiments of the method according to the invention. The invention additionally relates to a motor vehicle 1, for example a truck or a bus, comprising at least one system for choosing a transmission mode according to the invention.

The present invention is not limited to the above-described embodiments of the invention but relates to and comprises all embodiments within the scope of the appended independent claims.

The invention claimed is:

1. A method for choosing a transmission mode in a vehicle over the course of a road section, the method comprising the steps of:
   simulating, by a speed profile simulation unit of an automated controller comprising a computing unit processor, at least one future speed profile $v_{sim}$ for an actual speed for said vehicle over the course of said road section,
   wherein said simulating is conducted when said road section lies ahead of said vehicle and wherein said simulating is based at least on a road slope; and
   determining, by a current transmission mode time determining unit of the automated controller, a time period $T_{appl}$ ahead of said vehicle for which a current transmission mode is deemed to be applicable, wherein said determining is based on said at least one future speed profile $v_{sim}$ and that a lower transmission mode is chosen before a lowest permitted speed yawl defined for said road section and/or a set speed $v_{set}$ for a speed control is reached;
   evaluating, by a lower transmission mode choosing unit of the automated controller, whether a lower transmission mode shall be chosen, and choosing said lower transmission mod; when said applicable time period $T_{appl}$ is shorter than a first threshold period $T_{lim}$, wherein $T_{appl} < T_{lim}$, and
   controlling, by a utilization unit of the automated controller, a gearbox of the vehicle to implement the lower transmission mode when the lower transmission mode is chosen.

2. The method as claimed in patent claim 1, wherein
   said at least one future speed profile $v_{sim}$, comprises a future speed profile $v_{sim\_coast}$ related to coasting, in which coasting constitutes an imaginary highest gear position;
   prior to said road section, said vehicle has applied coasting; and
   said choosing of said lower transmission mode comprises a suspension of said coasting.

3. The method as claimed in claim 1, wherein said choosing of said lower transmission mode comprises a downshift from a higher physical gear position into a lower physical gear position for a gearbox in said vehicle.

4. The method as claimed in claim 1, wherein said time period $T_{appl}$ starts at a first moment $T_1$, when said simulating is conducted, and ends at a third moment $T_3$, when said at least one future speed profile $v_{sim}$, falls below said lowest permitted speed $v_{min}$.

5. The method as claimed in claim 4, further comprising determining a magnitude for said lowest permitted speed $v_{min}$ at least partially based on information related to a speed control system in said vehicle.

6. The method as claimed in claim 5, wherein said determining of said magnitude for said lowest permitted speed $v_{min}$ is realized by said speed control system.

7. The method as claimed in claim 5, wherein said magnitude for said lowest permitted speed $v_{min}$ is related to a reference speed $v_{ref}$ which is utilized by said speed control system.

8. The method as claimed in claim 5, wherein said magnitude for said lowest permitted speed $v_{min}$ is related to a current actual speed $v_{act}$ for said vehicle.

9. The method as claimed in claim 5, wherein said magnitude for said lowest permitted speed is altered dynamically.

10. The method as claimed in claim 1, wherein said time period $T_{appl}$ starts at a first moment $T_1$, when said simulating is conducted, and ends at a second moment $T_2$, said second moment $T_2$ being immediately before a third moment $T_3$, at which said future at least one speed profile $v_{sim}$ falls below said set speed $v_{set}$ for the speed control in said vehicle, in which said at least one future speed profile $v_{sim}$ falls below said lowest permitted speed $v_{min}$ at said third moment $T_3$.

11. The method as claimed in claim 1, wherein a force deficit according to said at least one future speed profile $v_{sim}$ will occur for said vehicle following expiry of said time period $T_{appl}$.

12. The method as claimed in claim 1, wherein said road slope is obtained from map data in combination with positioning information of said vehicle.

13. The method as claimed in claim 1, wherein said road slope is provided by a speed control system which utilizes map data and positioning information of said vehicle in controlling the speed.

14. The method as claimed in claim 1, wherein said road slope corresponds to a road slope encountered by said vehicle essentially at a first moment $T_1$ when said simulating is conducted.

15. The method as claimed in claim 1, further comprising determining said road slope based on at least one information type selected from the group consisting of:
- radar-based information;
- camera-based information;
- information obtained from a vehicle other than said vehicle;
- road slope information and positioning information stored earlier in the vehicle; and
- information obtained from a traffic system related to said road section.

16. The method as claimed in claim 1, wherein said evaluating step determines whether a torque needs to be requested from an engine in said vehicle following the expiry of said time period $T_{appl}$ in order that said actual speed $v_{act}$ shall remain higher than said lowest permitted speed $v_{min}$.

17. The method as claimed in claim 1, wherein said first threshold period $T_{lim}$ has a duration such that there is time for said choosing of said lower transmission mode and to give a torque in said lower transmission mode without said actual speed $v_{set}$ falling below said lowest permitted speed $v_{min}$ and/or said set speed $v_{set}$ for the speed control in said vehicle.

18. A computer program product comprising a non-volatile computer-readable medium on which a computer program is stored, the computer program comprising a program code, wherein when said program code is executed in a computer, instructs said computer to carry out the method as claimed in claim 1.

19. An automated control system for choosing a transmission mode in a vehicle over the course of a road section, said automated control system comprising:
- a future speed profile simulation unit of the automated control system, configured to conduct a simulation of at least one future speed profile $v_{sim}$ for an actual speed for said vehicle over the course of said road section, in which said simulation is conducted when said road section lies ahead of said vehicle and in which said simulation is based at least on a road slope;
- a current transmission mode time determining unit of the automated control system, configured to determine a time period $T_{appl}$ ahead of said vehicle, wherein during said time period $T_{appl}$, a current transmission mode is deemed to be applicable, said-determining is based on said at least one future speed profile $v_{sim}$ such that a lower transmission mode is chosen before a lowest permitted speed $v_{min}$ defined for said road section and/or a set speed $v_{set}$ for a speed control is reached;
- a lower transmission mode choosing evaluation unit of the automated control system, configured to evaluate whether a lower transmission mode shall be chosen, said lower transmission mode being chosen by said evaluation unit when said applicable time period $T_{appl}$ is shorter than a first threshold period $T_{lim}$, wherein $T_{appl} < T_{lim}$; and
- a utilization unit configured to control the gearbox of the vehicle to implement the lower transmission mode when the lower transmission mode is chosen.

20. The system as claimed in claim 19, wherein said system comprises a display unit arranged to present to a driver of said vehicle said lower transmission mode when said lower transmission mode has been deemed due for selection.

* * * * *